United States Patent
Velev et al.

(10) Patent No.: US 11,153,083 B2
(45) Date of Patent: Oct. 19, 2021

(54) ROGUE UNIT DETECTION INFORMATION

(71) Applicant: Motorola Mobility LLC, Chicago, IL (US)

(72) Inventors: Genadi Velev, Darmstadt (DE); Andreas Kunz, Ladenburg (DE); Joachim Loehr, Wiesbaden (DE); Prateek Basu Mallick, Langen (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 257 days.

(21) Appl. No.: 15/984,225

(22) Filed: May 18, 2018

(65) Prior Publication Data

US 2018/0367303 A1 Dec. 20, 2018

Related U.S. Application Data

(60) Provisional application No. 62/521,269, filed on Jun. 16, 2017, provisional application No. 62/533,849, filed on Jul. 18, 2017.

(51) Int. Cl.
*H04L 9/08* (2006.01)
*H04L 9/30* (2006.01)
(Continued)

(52) U.S. Cl.
CPC .......... *H04L 9/0872* (2013.01); *H04L 9/0891* (2013.01); *H04L 9/14* (2013.01);
(Continued)

(58) Field of Classification Search
CPC . H04L 9/0891; H04L 9/14; H04L 9/30; H04L 9/3297; H04L 9/0872; H04L 63/068; H04W 12/12
See application file for complete search history.

(56) References Cited

U.S. PATENT DOCUMENTS

| 6,920,559 B1* | 7/2005 | Nessett | H04L 9/0822 713/168 |
| 7,181,530 B1* | 2/2007 | Halasz | H04W 12/0602 709/238 |

(Continued)

FOREIGN PATENT DOCUMENTS

| WO | WO2011010736 A1 * | 1/2011 | ........... H04L 63/068 |
| WO | WO-2018076377 A1 * | 5/2018 | ............... H04L 9/08 |

OTHER PUBLICATIONS

3GPP TR 33.899 V1.1.0 (Mar. 2017), 3rd Generation Partnership Project, Technical Specification Group Services and System Aspects; Study on the security aspects of the next generation system (Release 14) 3GPP TR 33.899, hereinafter 3GPP (Year: 2017).*

(Continued)

*Primary Examiner* — Ali S Abyaneh
*Assistant Examiner* — Shu Chun Gao
(74) *Attorney, Agent, or Firm* — Kunzler Bean & Adamson

(57) ABSTRACT

Apparatuses, methods, and systems are disclosed for transmitting and/or receiving rogue unit detection information. One method includes maintaining rogue unit detection information. The rogue unit detection information includes a public key and a validity time corresponding to the public key. The method includes determining whether the validity time for the public key is within an expiration window. The method includes, in response to determining that the validity time for the public key is within the expiration window, transmitting a request for new rogue unit detection information. In some embodiments, the method includes receiving the new rogue unit detection information.

20 Claims, 9 Drawing Sheets

(51) Int. Cl.
- *H04L 9/32* (2006.01)
- *H04L 9/14* (2006.01)
- *H04L 29/06* (2006.01)
- *H04W 12/122* (2021.01)
- *H04W 12/126* (2021.01)

(52) U.S. Cl.
CPC .............. *H04L 9/30* (2013.01); *H04L 9/3297* (2013.01); *H04L 63/068* (2013.01); *H04W 12/122* (2021.01); *H04W 12/126* (2021.01)

(56) References Cited

U.S. PATENT DOCUMENTS

| | | | | |
|---|---|---|---|---|
| 8,191,144 | B2 * | 5/2012 | Cam Winget | H04L 63/126 726/23 |
| 8,281,392 | B2 * | 10/2012 | Sinha | H04L 63/1441 726/22 |
| 9,252,958 | B1 * | 2/2016 | Tempel | H04L 9/3271 |
| 2005/0289652 | A1 * | 12/2005 | Sharma | G06Q 20/40975 726/26 |
| 2016/0105283 | A1 * | 4/2016 | Mityagin | H04L 63/068 380/279 |
| 2017/0126411 | A1 | 5/2017 | Piqueras Jover et al. | |
| 2021/0156949 | A1 * | 5/2021 | Liou | G01S 5/0244 |

OTHER PUBLICATIONS

LTE 3GGP, "3rd Generation Partnership Project; Technical Specification Group Services and System Aspects; Study on the security aspects of the next generation system" (Release 14), 3GPP TR 33.899 V1.0.0, Mar. 2017, pp. 1-471.

PCT/US2018/0353, "Ntofication of Transmittal of the International Search Report and the Written Opinion of the International Searching Authority, or the Declaration", International Searching Authority, Aug. 16, 2018, pp. 1-15.

LTE 3GPP, "3rd Generation Partnership Project; Technical Specification Group Services and System Aspects; Procedures for the 5G System; Stage 2" (Release 15), 3GPP TS 23.502 V0.4.0, May 2017, pp. 1-126.

SA3, "LS on Support for fake gNB detection mechanisms", 3GPP TSG-SA WG3 Meeting #87, S3-171568, May 15-19, 2017, pp. 1-2.

* cited by examiner

ROGUE UNIT DETECTION INFORMATION

CROSS-REFERENCE TO RELATED APPLICATIONS

This application claims priority to U.S. Patent Application Ser. No. 62/533,849 entitled "ROGUE BASE STATION DETECTION-KDF" and filed on Jul. 18, 2017 for Andreas Kunz and U.S. Patent Application Ser. No. 62/521,269 entitled "ROGUE BASE STATION DETECTION AND KEY RENEWAL" and filed on Jun. 16, 2017 for Genadi Velev, all of which are incorporated herein by reference in their entirety.

FIELD

The subject matter disclosed herein relates generally to wireless communications and more particularly relates to rogue unit detection information.

BACKGROUND

The following abbreviations are herewith defined, at least some of which are referred to within the following description: Third Generation Partnership Project ("3GPP"), Fifth Generation ("5G"), Authentication Authorization and Accounting ("AAA"), Positive-Acknowledgment ("ACK"), Authentication and Key Agreement ("AKA"), Acknowledged Mode ("AM"), Access and Mobility Management Function ("AMF"), Access Server ("AS"), Access Point ("AP"), Authentication Center ("AuC"), Authentication Server Function ("AUSF"), Authentication Token ("AUTN"), Base Station ("BS"), Bandwidth ("BW"), Cell Group ("CG"), Cipher Key ("CK"), Cell Radio Network Temporary Identifier ("C-RNTI"), Common Physical Downlink Control Channel ("C-PDCCH"), Control Plane ("CP"), Core Network ("CN"), Dedicated Control Channel ("DCCH"), Downlink ("DL"), Demodulation Reference Signal ("DMRS"), Domain Name System ("DNS"), Denial of Service ("DoS"), Device to Device ("D2D"), Enhanced Mobile Broadband ("eMBB"), Evolved Node B ("eNB"), Enhanced Subscriber Identification Module ("eSIM"), Equipment Identity Register ("EIR"), Evolved Packet Core ("EPC"), European Telecommunications Standards Institute ("ETSI"), Frequency Division Multiple Access ("FDMA"), Fully Qualified Domain Name ("FQDN"), 5G Node B ("gNB"), General Packet Radio Service ("GPRS"), Global System For Mobile Communications ("GSM"), Global System For Mobile Communications Association ("GSMA"), Hybrid Automatic Repeat Request ("HARQ"), Home Public Land Mobile Network ("HPLMN"), Home Subscriber Server ("HSS"), Identity or Identifier or Identification ("ID"), Information Element ("IE"), Integrity Key ("IK"), International Mobile Equipment Identity ("IMEI"), International Mobile Subscriber Identity ("IMSI"), Internet-of-Things ("IoT"), Key Derivation Function ("KDF"), Layer 2 ("L2"), Long Term Evolution ("LTE"), Master Information Block ("MIB), Mobility Management ("MM"), Mobility Management Entity ("MME"), Non-Access Stratum ("NAS"), Network Entity ("NE"), Next Generation Node B ("gNB"), New Radio ("NR"), Operation and Maintenance Center ("OAM"), Open Mobile Alliance Device Management ("OMA DM"), Orthogonal Frequency Division Multiplexing ("OFDM"), Over-the-Air ("OTA"), Policy Control Function ("PCF"), Public Land Mobile Network ("PLMN"), Quality of Service ("QoS"), Random Access Channel ("RACH"), Radio Access Technology ("RAT"), Radio Resource Control ("RRC"), Radio Access Network ("RAN"), Security Anchor Function ("SEAF"), Sequence Number ("SN"), Single Carrier Frequency Division Multiple Access ("SC-FDMA"), Subscriber Management Function ("SMF"), Subscriber Identity Module ("SIM"), System Information Block ("SIB"), Subscription Concealed Identifier ("SUCI"), Subscription Permanent Identifier ("SUPI"), Tracking Area ("TA"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane Function ("UPF"), Universal Subscriber Identity Module ("USIM"), Universal Time Coordinated ("UTC"), Visited Public Land Mobile Network ("VPLMN"), and Worldwide Interoperability for Microwave Access ("WiMAX").

In certain wireless communications networks, there may be a rogue base station that imitates a real base station by faking being a real base station. In such networks, detecting the rogue base station may be difficult.

BRIEF SUMMARY

Methods for transmitting and/or receiving rogue unit detection information are disclosed. Apparatuses and systems also perform the functions of the apparatus. In one embodiment, the method includes maintaining rogue unit detection information. In such an embodiment, the rogue unit detection information includes a public key and a validity time corresponding to the public key. In certain embodiments, the method includes determining whether the validity time for the public key is within an expiration window. In various embodiments, the method includes, in response to determining that the validity time for the public key is within the expiration window, transmitting a request for new rogue unit detection information. In some embodiments, the method includes receiving the new rogue unit detection information.

An apparatus for receiving rogue unit detection information, in one embodiment, includes a processor that: maintains rogue unit detection information, wherein the rogue unit detection information includes a public key and a validity time corresponding to the public key; and determines whether the validity time for the public key is within an expiration window. In some embodiments, the apparatus includes a transmitter that, in response to determining that the validity time for the public key is within the expiration window, transmits a request for new rogue unit detection information. In various embodiments, the apparatus includes a receiver that receives the new rogue unit detection information.

A method for transmitting rogue unit detection information, in one embodiment, includes determining whether a remote unit has rogue unit detection information expiring within an expiration window. In such an embodiment, the rogue unit detection information includes a public key and a validity time corresponding to the public key. In certain embodiments, the method includes, in response to determining that the remote unit has rogue unit detection information expiring within the expiration window, determining new rogue unit detection information for the remote unit. In various embodiments, the method includes transmitting the new rogue unit detection information to the remote unit.

An apparatus for transmitting rogue unit detection information, in one embodiment, includes a processor that: determines whether a remote unit has rogue unit detection information expiring within an expiration window, wherein the rogue unit detection information includes a public key and a validity time corresponding to the public key; and, in response to determining that the remote unit has rogue unit detection information expiring within the expiration window, determines new rogue unit detection information for the remote unit. In some embodiments, the apparatus includes a transmitter that transmits the new rogue unit detection information to the remote unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
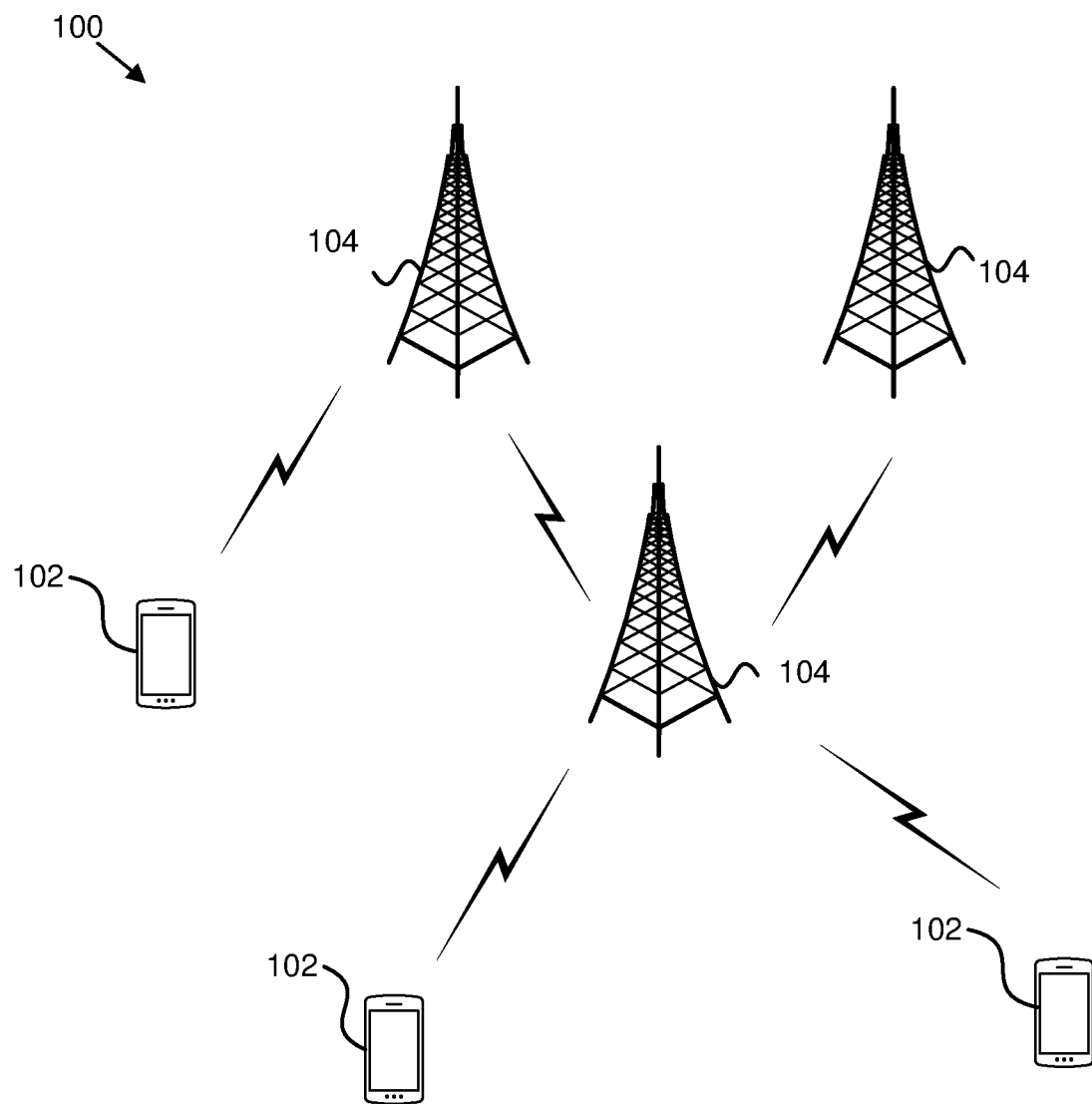
FIG. 1 is a schematic block diagram illustrating one embodiment of a wireless communication system for transmitting and/or receiving rogue unit detection information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving rogue unit detection information. As used herein, a rogue unit may be a rogue (e.g., fake, false, pretending, mimicking, etc.) base station, a rogue network unit, or some other rogue device. Moreover, rogue unit detection may refer to detecting a rogue unit, determining whether a device is a rogue unit, searching for a rogue unit, identifying a rogue unit, or some other way of showing that a device is a rogue unit. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base unit, a base station, a Node-B, an eNB, a gNB, a Home Node-B, a relay node, a device, a network device, an infrastructure device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components an eNB, a gNB, an AMF, a DB, an MME, a PCF, a UDR, a UPF, a serving gateway, and/or a UDM.

In one implementation, the wireless communication system 100 is compliant with the NR/5G protocols or LTE protocols specified by 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may be used to maintain rogue unit detection information. In such an embodiment, the rogue unit detection information may include a public key and a validity time corresponding to the public key. In certain embodiments, the remote unit 102 may include determining whether the validity time for the public key is within an expiration window. In various embodiments, the remote unit 102 may include, in response to determining that the validity time for the public key is within the expiration window, transmitting a request for new rogue unit detection information. In some embodiments, the remote unit 102 may include receiving the new rogue unit detection information. Accordingly, a remote unit 102 may be used for receiving rogue unit detection information.

In certain embodiments, a network unit 104 may be used to determine whether a remote unit 102 has rogue unit detection information expiring within an expiration window. In such an embodiment, the rogue unit detection information includes a public key and a validity time corresponding to the public key. In certain embodiments, the network unit 104 may include, in response to determining that the remote unit 102 has rogue unit detection information expiring within the expiration window, determining new rogue unit detection information for the remote unit 102. In various embodiments, the network unit 104 may include transmitting the new rogue unit detection information to the remote unit 102. Accordingly, a network unit 104 may be used for transmitting rogue unit detection information.

Figure 2:
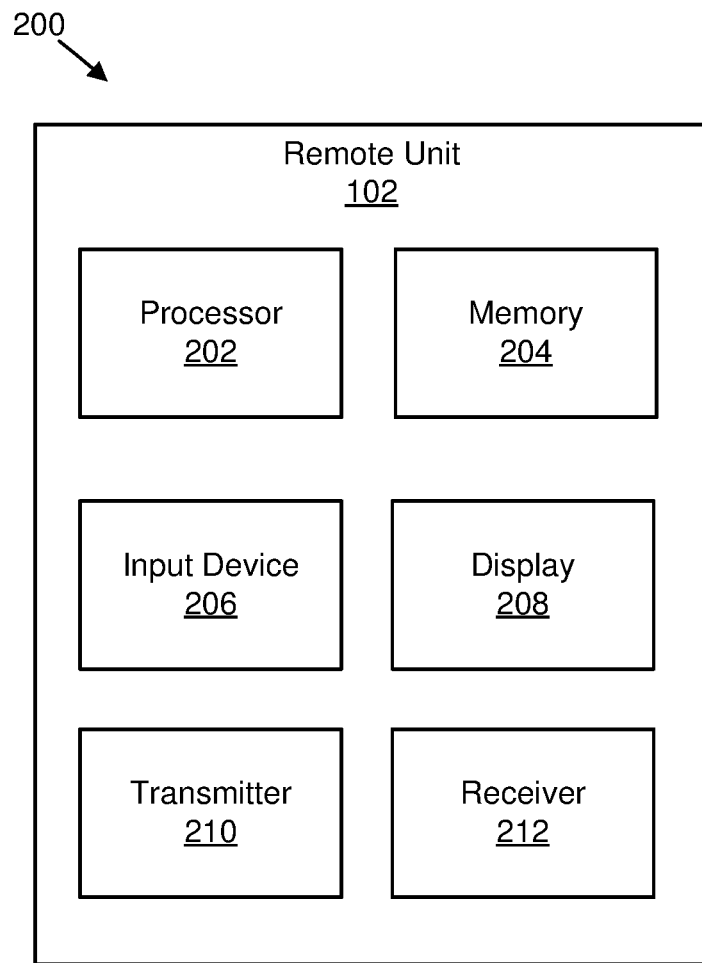
FIG. 2 is a schematic block diagram illustrating one embodiment of an apparatus that may be used for receiving rogue unit detection information.

FIG. 2 depicts one embodiment of an apparatus 200 that may be used for receiving rogue unit detection information.

The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may: maintain rogue unit detection information, wherein the rogue unit detection information includes a public key and a validity time corresponding to the public key; and determine whether the validity time for the public key is within an expiration window. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In certain embodiments, the transmitter 210 may, in response to determining that a validity time for a public key is within an expiration window, transmit a request for new rogue unit detection information. In some embodiments, the receiver 212 may receive the new rogue unit detection information. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
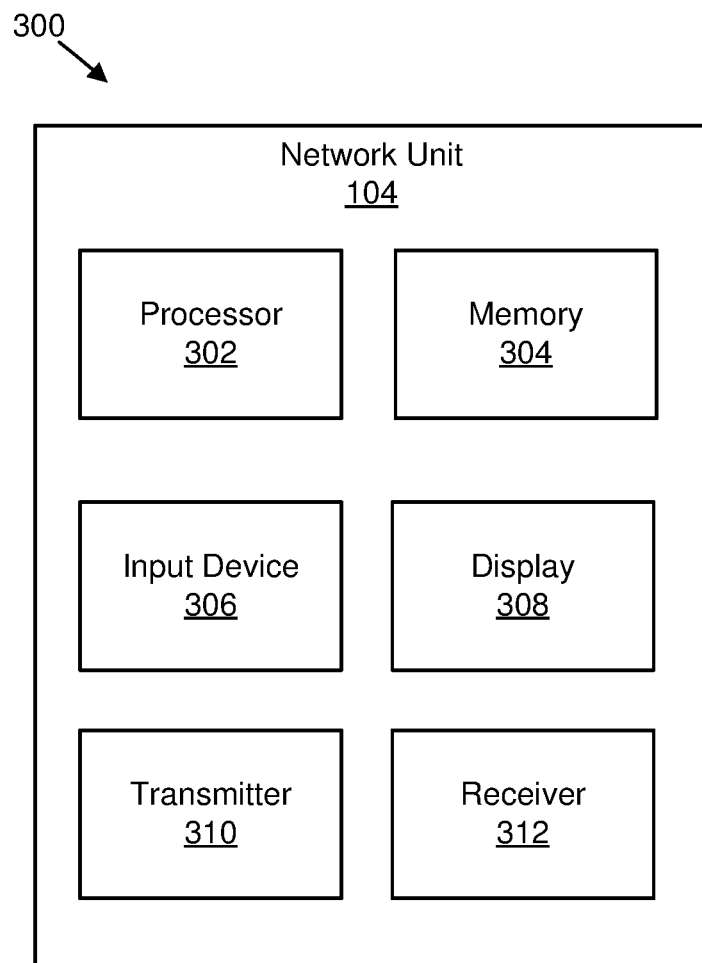
FIG. 3 is a schematic block diagram illustrating one embodiment of an apparatus that may be used for transmitting rogue unit detection information.

FIG. 3 depicts one embodiment of an apparatus 300 that may be used for transmitting rogue unit detection information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the processor 302 may: determine whether a remote unit 102 has rogue unit detection information expiring within an expiration window, wherein the rogue unit detection information includes a public key and a validity time corresponding to the public key; and, in response to determining that the remote unit 102 has rogue unit detection information expiring within the expiration window, determines new rogue unit detection information for the remote unit 102. In some embodiments, the transmitter 310 may transmit the new rogue unit detection information to the remote unit 102. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, during a time in which a remote unit 102 is in an idle state (e.g., RRC IDLE state), the remote unit 102 may be camping on a network unit 104 (e.g., base station) and may be only listening to broadcast information and/or a paging channel to determine whether there is any mobile terminating request for the remote unit 102. In various embodiments, the remote unit 102 may be camping on a rogue network unit. In such embodiments, the remote unit 102 may never receive a paging message from a real network because it only listens to the rogue remote unit. Moreover, the rogue remote unit may perform DoS attacks on the remote unit 102 in various ways.

In some embodiments, in response to a remote unit 102 camping on a fake cell during an idle state (and no authenticity verification is performed), then a rogue network unit may successfully mount a DoS attack on the remote unit 102 for the following services obtained during a time that the remote unit 102 is in the idle state: a) mobile terminated services (e.g., incoming calls, connection request from application servers, etc.) and/or a system information change; b) broadcast system information and/or radio resources configured via the broadcast system information for D2D discovery, communication, transmission, and/or reception; and/or c) relevant system information and/or control information indicated in system information for MBMS reception.

In various embodiments, mounting of various attacks by a rogue network unit without knowledge of a remote unit 102 may be possible (e.g., especially in auditoriums, play grounds, shopping malls, corporate buildings, conference venues, theatres, and so forth). Moreover, unless the remote unit 102 initiates a service, the remote unit 102 may not leave a rogue network unit (e.g., fake cell) and all mobile terminated services and/or service information may be blocked by the rogue network unit.

In certain embodiments, to facilitate reducing problems associated with rogue network units, a network may make a private key and distribute the private key to network units 104. In such embodiments, the remote unit 102 may derive the public key from corresponding root keying material. In some embodiments, a private key may not be distributed to all network units 104; therefore, one or more network units 104 may compromised and/or hacked making a network system vulnerable.

In various embodiments, a remote unit 102 may transition to a connected state (e.g., RRC Connected) as a result of idle state (e.g., RRC Idle) and/or inactive state (e.g., RRC Inactive) cell selections and/or reselections, and may obtain a new public key from the network. However, this may be inefficient and may drain a remote unit 102 battery in short time (e.g., as a result of a remote unit 102 being highly mobile and/or in fluctuating radio conditions).

Figure 4:
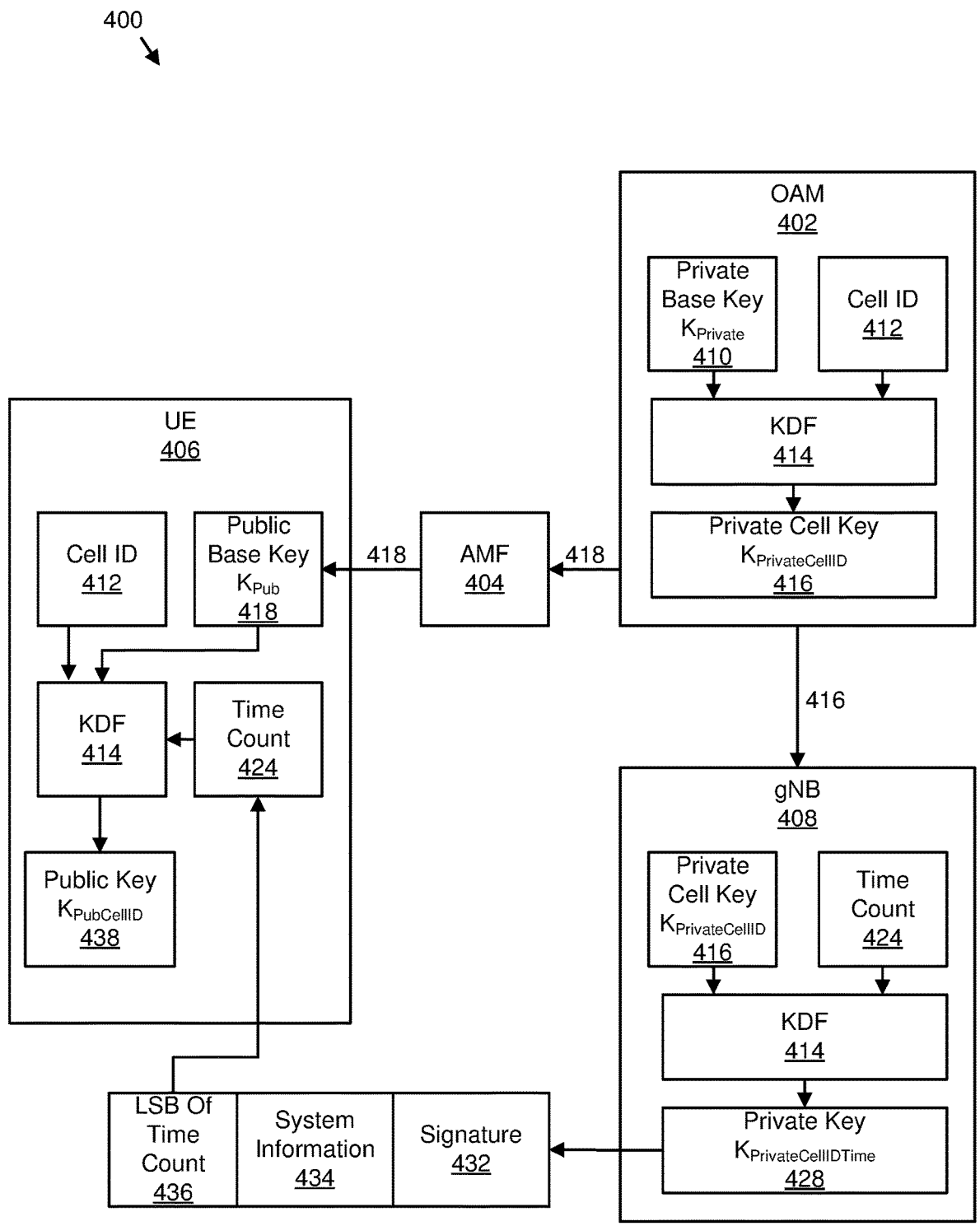
FIG. 4 is a schematic block diagram illustrating one embodiment of a system for network unit specific keys.

FIG. 4 is a schematic block diagram illustrating one embodiment of a system 400 for network unit specific keys. The system 400 includes an OAM 402, an AMF 404, a UE 406, and a gNB 408.

As used herein, the AMF 404 (or MME) may be any CP CN network function handling control signaling directed towards the UE 406. Moreover, an entity storing a private key and distributing it may not only be the OAM 402 but may also be an HSS, a UDM, or any other secure storage entity. The UE 406 may be similar to the remote unit 102 described herein, and the gNB 408 may be similar to the network unit 104 described herein.

In the OAM 402, a private base key ("$K_{Private}$") 410 and a cell ID 412 may be used by a KDF 414 to produce a private cell key ("$K_{PrivateCellID}$") 416. The OAM 402 may provide a public base key ("$K_{Pub}$") 418 to the AMF 404 which in turn provides the public base key 418 to the UE 406. The OAM 402 may provide the private cell key 416 to the gNB 408.

In the gNB 408, the private cell key 416 and a time count 424 may be used by the KDF 414 to produce a private key ("$K_{PrivateCellIDTime}$") 428. The gNB 408 may provide information broadcast in a SIB to the UE 406 that includes a signature 432, system information 434, and an LSB of time count 436.

In the UE 406, the private base key 418, the cell ID 412, and the time count 424 may be used by the KDF 414 to produce a public key ("$K_{PubCellID}$") 438.

As used herein, the private base key 410 may be a key maintained in a central repository (e.g., an OAM entity, an HSS, or a similar secure environment). The private base key 410 may never leave the secure environment and may never be passed on to the other network elements.

Moreover, the private cell key 416 may be a key derived using a KDF from the private base key 410 using some network element or node specific parameter (e.g., cell ID 412). The private cell key 416 may be unique in a wide geographical area like a TA, a list of TAs, a PLMN, and/or globally. In one possible example, the network element or node specific parameter may be a cell identity like a 28 bit cell identity that may be broadcast in SIB 1 (e.g., in an LTE system).

As used herein, the private key 428 may be a key derived in a RAN node (e.g. the gNB 408 in a $5^{th}$ generation NR) in combination with a freshness parameter (e.g., a coordinated universal time "UTC" time or a counter from the private cell key 416 used to generate and/or assign a security signature). The signature 432 may be used to verify the authenticity of the network and may be part of broadcast information.

Furthermore, the public base key 418 may be used by UEs to generate the public key 438. The public base key 418 may be provided to UEs from the network (e.g., using NAS signaling as a result of NAS procedures including a registration procedure, location and/or TA update procedure, and/or the like).

The public key 438 may be used by UEs to verify the signature 432 broadcast by the network. A successful verification may mean a genuine network and a failed verification may mean a fake network. The public key 438 may be derived from the public base key 418 using same input parameters as used in the derivation of the private cell key 416 from the private base key 416. Input parameters like the cell ID 412 may either be known by the UE 406 (e.g., from other broadcast information like a 28 bit cell identity in SIB1 in LTE), may be synchronously attainable like a UTC time, and/or may be a counter value published in a same broadcast message as one containing the signature 432.

In the illustrated embodiment, the private base key 410 is used to derive the private cell key 416 in the OAM 402, but this could occur in any secure central entity. The private cell key 416 is then used to create the signature 432 and the signature 432 is broadcast as part of the SIB in the cell. The signature 432 itself could be a ciphered text in which the corresponding clear text is known to genuine UEs in the cell (e.g., since these UEs are registered in the cell/TA area); the signature 432 could be a checksum that can be validated by the genuine UEs; and/or the signature 432 may be any SIB that is ciphered and the UE 406 upon deciphering the signature 432 may ensure that the values of all the parameters in the SIB are in accordance with specified configurable values. The signature 432 itself may be included as one IE, a parameter in any of the SIBs and/or may be a separate SIB by itself.

Moreover, in the illustrated embodiment, the public base key 418 may be signaled to the UE 406 from the network using NAS or AS (e.g., RRC) signaling. The UE 406 may further derive the public key 438 from the public base key 418 and uses the public base key 418 to verify the signature 432 included by the network in the broadcast message. A successful verification may mean a genuine network and a failed verification may mean a fake network. Other possibilities to provide the public base key 418 to the UE 406 may be some pre-configuration in a UICC/USIM or a configuration in the UE 406 with OMA DM. As may be appreciated, the input parameter to the KDF 414 called the time count 424 may be used as a freshness parameter to limit the validity of generated keys on either side.

Figure 5:
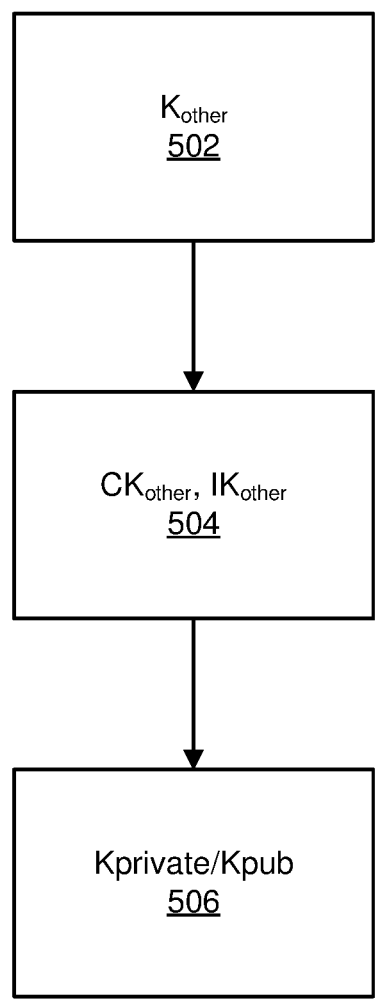
FIG. 5 is a schematic block diagram illustrating one embodiment of a key hierarchy.

FIG. 5 is a schematic block diagram illustrating one embodiment of a key hierarchy 500. As illustrated a $K_{other}$ 502 may be at a first key hierarchy level, a $CK_{other}$, $IK_{other}$ 504 may be at a second key hierarchy level, and a Kprivate/Kpub 506 may be at a third hierarchy level.

In certain embodiments, the key derivation of the base keys (e.g., private base key and public base key) may be from one of the keys in the key hierarchy 500 (e.g., as defined in Section 6.2 of 3GPP TS 33401-e10). For example, the public base key may be generated (e.g., in the network and/or in the UE) based on $K_{other}$ 502 which is different from K (e.g., K may be a permanent key stored on a USIM, on a UICC, and in an AuC). As another example, the public base key may be generated (e.g., in the network and/or in the UE) based on $CK_{other}$, $IK_{other}$ 504 which is different from CK, IK (e.g., CK, IK is a pair of keys derived in the AuC and on the USIM during an AKA run). In some embodiments, the $K_{other}$ 502 or the $CK_{other}$, $IK_{other}$ 504 may be universally known to genuine UEs. In certain embodiments, for all UEs of an operator in its PLMN, a derived public key may be the same. The public key may be derived using a PLMN ID as an input parameter in a KDF. $K_{other}$ 502 is just one example, the public base key may be derived from SEAF key (e.g. $K_{SEAF}$) or directly from the AUSF key (e.g. $K_{AUSF}$). In an embodiment involving roaming, a VPLMN may need to update and/or reconfigure a UE with a currently used local public base key.

Figure 6:
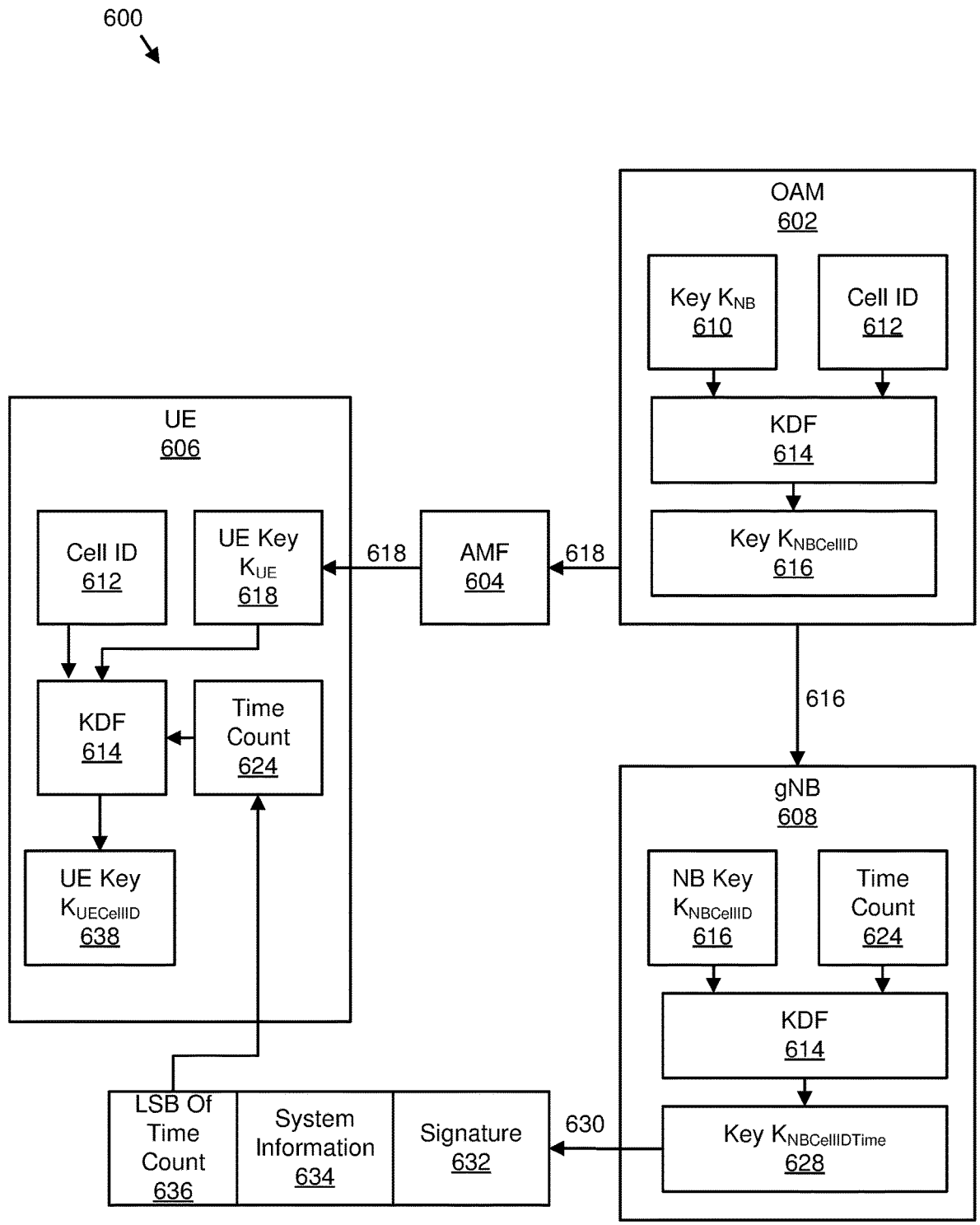
FIG. 6 is a schematic block diagram illustrating one embodiment of a system for symmetric keys.

FIG. 6 is a schematic block diagram illustrating one embodiment of a system for symmetric keys. The system 600 includes an OAM 602, an AMF 604, a UE 606, and a gNB 608.

As used herein, the AMF 604 (or MME) may be any CP CN network function handling control signaling directed towards the UE 606. Moreover, an entity storing a private key and distributing it may not only be the OAM 602 but may also be an HSS, a UDM, or any other secure storage entity. The UE 606 may be similar to the remote unit 102 described herein, and the gNB 608 may be similar to the network unit 104 described herein.

In the OAM 602, a key ("$K_{NB}$") 610 and a cell ID 612 may be used by a KDF 614 to produce a key ("$K_{NBCellID}$") 616. The OAM 602 may provide a UE key ("$K_{UE}$") 618 to the AMF 604 which in turn provides the UE key $K_{UE}$ 618 to the UE 606. The OAM 602 may provide the key $K_{NBCellID}$ 616 to the gNB 608.

In the gNB 608, the key $K_{NBCellID}$ 616 and a time count 624 may be used by the KDF 614 to produce a key ("$K_{NBCellIDTime}$") 628. The gNB 608 may provide information broadcast in a SIB to the UE 606 that includes a signature 632, system information 634, and an LSB of time count 636.

In the UE 606, the UE key $K_{UE}$ 618, the cell ID 612, and the time count 624 may be used by the KDF 614 to produce a UE key ("$K_{UECellID}$") 638.

The embodiment illustrated in FIG. 6 is similar to the embodiment illustrated in FIG. 4 with a difference being that keys exchanged are not public/private keys but are symmetric keys for encryption. The OAM 602 derives the keys for each cell ID (e.g., the key $K_{NBCellID}$ 616) and provisions them to the gNBs. The gNB 608 derives (with the KDF 614 and a freshness parameter that may be based on time (e.g., the time count 624)) the key $K_{NBCellIDTime}$ 628, which is used to create the signature 632 or a one way hash value of system information. Instead of the time count 624, a random value may be generated and used as a freshness input parameter. The OAM 602 configures the AMFs with the UE key $K_{UE}$ 618, which corresponds to the $K_{NB}$ in the OAM 610 as a master key for deriving all cell specific keys. In some embodiments, the AMF 604 provisions the UE key $K_{UE}$ 618 to the UE 606 in encrypted NAS signaling. The UE 606 may derive the UE key $K_{UECellID}$ 638 taking into account a freshness parameter which is broadcast also in a system information block. The UE 606 may perform a one way hash or signature of broadcast system information and may compare it with information that is broadcast. If the comparison shows that they are the same, the gNB 608 may be authenticated. Replay attacks may be detected by the UE 606 if an attacker needs more time for a copy and broadcast action than a time interval the gNB 608 is taking for refreshing the signature 632, which may be at minimum every frame start. The UE 606 may experience a different UTC time broadcast between different gNBs.

In some embodiments, security material (e.g., keys) may be configured in a remote unit 102 and in a network unit 104 (e.g., a gNB) to enable the remote unit 102 to detect whether a cell the remote unit 102 is camping on is rogue or not. If the keys are used (e.g., key validity) for long time, then an intruder may be able to crack the keys. Therefore, renewing and/or refreshing of keys may be dynamically used by the remote unit 102 and/or the network unit 104 with limited signaling and/or configuration.

As described herein, a remote unit 102 may verify the authenticity of a network entity ("NE") such as a gNB, a base station ("BS"), or the like. In certain embodiments, a private-public key pair may be used for verifying the authenticity of a NE cell. In some embodiments, in response to selecting a cell on a certain radio frequency, a remote unit 102 may first verify that the cell belongs to a genuine network unit 104. The purpose may be to avoid remote unit 102 camping on a cell belonging to a rogue network unit. In various embodiments, only if an authentication and/or verification is successful will a remote unit 102 stay on a selected cell (e.g., camp on the selected cell).

In some embodiments, a private key may be provided to a network unit 104 which may be used to sign certain information used for verification of authenticity of a NE. The signed information may be send and/or broadcast via a newly introduced SIB or the signed information may be a part of existing SIB. In certain embodiments, a remote unit 102 may receive a public key (e.g., at a time of attach or in a tracking area accept message), and may use the public key for decrypting signed system information. In various embodiments, in response to decryption being successful, authenticity of a NE may be proven.

In some embodiments, verification about whether decryption is successful may be done at an RRC layer at the remote unit 102. In one embodiment, a checksum (e.g., added to system information) may be used for determining whether decryption is successful. In various embodiments, the content of system information used for verifying the authenticity of a NE may be known to the remote unit 102. For example, system information used for verifying a genuine NE may be contained in a PLMN ID broadcast in the SIB1.

In certain embodiments, received system information broadcast in a cell for the purpose of verifying a genuine NE/cell may be delivered from an RRC layer to a different layer performing the task of deciphering the received SI based on a public key and validating whether deciphering was successful.

In some embodiments, from a security point of view, it may be important to refresh and/or change keys (e.g., public key in the remote unit 102 and private key in network unit 104 (e.g., NE)) after a certain predetermined elapsed time period.

In one embodiment, there may be multiple keys configured in the remote unit 102 (e.g., public keys called "Key_RogueDet") having different but overlapping validity times. In another embodiment, there may be multiple keys configured in the remote unit 102 having different validity times terminating and starting at a well-defined time (e.g., a UTC time). In various embodiments, the remote unit 102 may store multiple keys (e.g., a current key and a future key).

In certain embodiments, a validity time of a currently used key by a network unit 104 (e.g., a private key) may be broadcast by the cell. In some embodiments, the validity time may be signaled within system information (e.g., in MIB or SIB1). In various embodiments, the validity time may denote UTC time at a point in time at which keys are changed, refreshed, and/or renewed. Accordingly, the remote unit 102 may determine which public key to use based on the validity information received from the SIB information.

In some embodiments, remote units 102 may facilitate receiving a new public key and using it for verifying the authenticity of a network unit 104 after expiration of a validity time of an old key. In certain embodiments, remote units 102 may make sure that they always have a correct public key.

In various embodiments, a broadcast validity time may denote a point of time (e.g., UTC) from which a network unit 104 began using current keys for ciphering. In some embodiments, remote units 102, before verifying authenticity of a network unit 104, may read a broadcast validity time and may check whether a current key is still in use. In embodiments in which keys have been refreshed and/or changed, a remote unit 102 may acquire a new public key.

Figure 7:
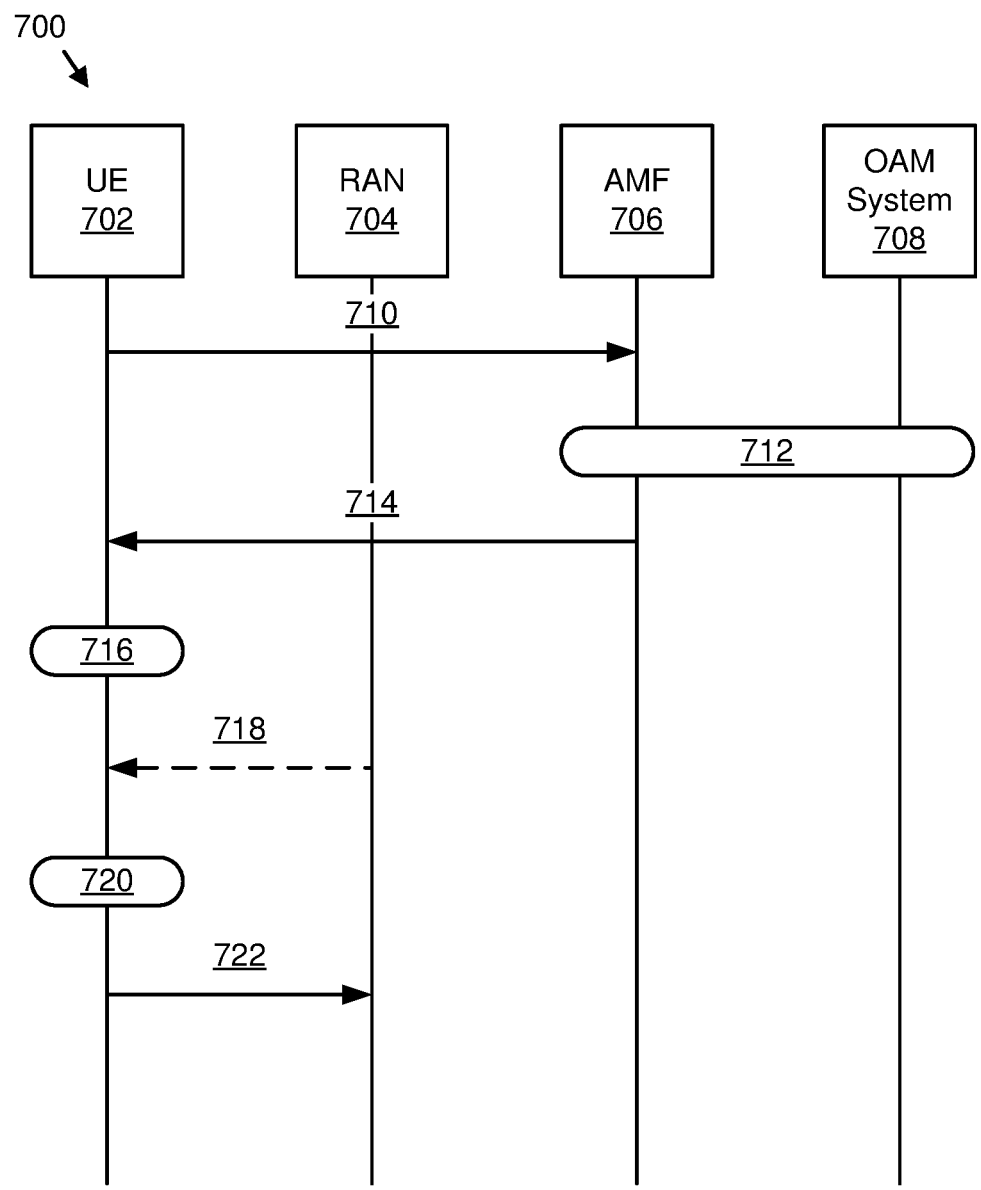
FIG. 7 is a diagram illustrating one embodiment of communications for remote unit key configuration.

One embodiment illustrating public key renewal and/or refresh is shown in FIG. 7. In certain embodiments, public key material for rogue cell detection may be managed at an NAS layer. In various embodiments, a remote unit 102 or a network unit 104 (e.g., AMF) may be able to detect a need of a key reconfiguration at the remote unit 102 based on a key validity and/or a periodic registration timer. In some embodiments, an NAS signaling protocol may be used to initially configure, to update, to renew, and/or to refresh a public key in the remote unit 102.

FIG. 7 is a diagram illustrating one embodiment of communications 700 for remote unit key configuration. The communications 700 include communications between a UE 702, a RAN 704, an AMF 706, and an OAM system 708. Any of the communications described herein may include one or more messages.

In certain embodiments, in a first communication 710 from the UE 702 to the RAN 704, the UE 702 may, during a registration management ("RM") procedure (e.g., 5G NAS registration procedure or 4G NAS attach or TA updated procedure), indicate via the RAN 704 to the core network (e.g. AMF 706) that a renewal and/or refresh of key material for rogue cell detection is useful. In one embodiment, the first communication 710 includes a "Key_RogueDet" indication. In some embodiments, the UE 702 may determine that there is no "Key_RogueDet" configured (e.g., during initial registration procedure). In some embodiments, the UE 702 may determine that validity of a currently used key is within an expiration window (e.g., is about to expire before a next periodic registration procedure, has already expired, etc.). In such embodiments, the UE 702 may compare a remaining validity time with a periodic registration timer. If the periodic registration timer is smaller than the remaining validity time, the UE 702 may include the indication for "Key_RogueDet" renewal. If the periodic registration timer is larger than the remaining validity time, the UE 702 may decide to not include the indication for "Key_RogueDet" renewal.

In certain embodiments, the UE 702 may use a periodic and/or a mobility registration procedure to indicate a need for a new public key for rogue detection. However, in various embodiments, the UE 702 may explicitly trigger a registration management procedure for key renewal in embodiments in which a current key is going to expire before a next scheduled periodic registration procedure. In such embodiments, the UE 702 may not be able to authenticate a genuine network unit 104 until the registration management procedure is successful. In various embodiments, a similar situation may occur in a roaming environment in which the UE 702 is not preconfigured with a local public key.

In some embodiments, the UE 702 may trigger an NAS registration procedure upon detecting that a new public key is required. In such embodiments, the UE 702 may include a new establishment cause value in an RRC connection request message (e.g., provided by an NAS layer to the RRC layer) at a time of triggering an RRC connection request message for the purpose of acquiring a new public key. In various embodiments, the UE 702 may set a flag in signaling indicating that the UE 702 requests a new public key for verifying authenticity of network units 104.

In certain embodiments, although a simultaneous request for key renewal may be avoided (e.g., using a periodic registration procedure), there might be situations in which many UEs 702 trigger an RRC connection request procedure at the same time to acquire a new key which may lead to some congestion (e.g., the RACH procedures may be, according to one embodiment, distributed across the UEs 702 over some time period). In some embodiments, the UE 702, before performing an RRC connection request procedure, may draw a random number between 0 and some predefined value in order to achieve a uniform distribution of RACH procedures.

In various embodiments, upon reception of an RM request message (e.g., the first communication 710) from the UE 702, the network may determine 712 that key material (e.g., "Key_RogueDet") at the UE 702 is to be updated. In some embodiments, the network (e.g. AMF 706) may use the indication from the UE 702 in the first communication 710 to determine the need of key renewal (e.g., the network may rely on the indication from the UE 702). In certain embodiments, the network (e.g., the AMF 706) may store the "Key_RogueDet" related information in the UE's 702 RM context, and by this, the network may determine without an indication from the UE 702 whether "Key_RogueDet" renewal is needed and/or required.

In various embodiments, the network may determine a need for "Key_RogueDet" information renewal during the registration management ("RM") procedure or during other NAS procedures (e.g., during a service request procedure or at any time during which the UE 702 is in a connected state (e.g., CM-CONNECTED state) and there is an existing NAS signaling connection).

In some embodiments, keys are changed at a predefined interval which may be known to the UEs 702 (e.g., every 3 hours the keys are changed). In various embodiments, the UE 702 may acquire a new key somewhere within a predefined interval know to the UE 702.

In certain embodiments, in a second communication 714 from the AMF 706 to the UE 702, if the network (e.g. the AMF 706) determines that the "Key_RogueDet" needs to be updated in the UE 702, the AMF 706 transmits a newer and/or fresher "Key_RogueDet" to the UE 702 which may be used in the mobility registered area. As may be appreciated, the mobility registered area may be a PLMN, a TA, a number of TAs, a certain number of cells, and/or just one cell. The new "Key_RogueDet" may have a new validity time. In some embodiments, an NAS message carrying the newer "Key_RogueDet" information may be included in an RM accept message (or an attach/tracking area update "TAU" accept message) and/or in an NAS UE configuration update message (used for a UE configuration update procedure). Considering the latter NAS UE configuration update message, with other words, the communication 714 from the AMF 706 to the UE 702 can be performed without communication 710, but instead the need for the new "Key_RogueDet" is performed entirely in the network and communicated to the UE.

In various embodiments, the second communication 714 may include information about deletion of previously configured "Key_RogueDet" information in the UE 702. For example, the network may determine that previously configured "Key_RogueDet" information in the UE 702 is no longer used in RAN entities.

In some embodiments, the UE 702 may update 716 its context in which the "Key_RogueDet" information is stored based on a received NAS message (e.g., NAS RM accept message). Moreover, the UE 702 may deleted old (e.g., expired) "Key_RogueDet" information and/or configure new "Key_RogueDet" information. Furthermore, the UE 702 may maintain one or multiple Key_RogueDet information simultaneously.

In certain embodiments, in a third communication 718 (e.g., optional communication), from the RAN 704 to the UE 702, the RAN 704 may transmit SIB information. The UE 702 may monitor the corresponding SIB information in which the encrypted information for rogue detection is broadcast by the RAN 704.

In some embodiments, the UE 702 determines 720 cell authenticity at each cell selection procedure. In various embodiments, the UE 702 verifies the broadcast signature and/or encrypted information (e.g., SIB25) with the first "Key_RogueDet." If the verification works, then the network is fine (e.g., not rogue). If the verification does not work, the UE 702 verifies the signature and/or encrypted info (e.g., SIB25) using the second "Key_RogueDet." If this second verification works, then the network is fine. If the verification with the second "Key_RogueDet" succeeded, then the UE 702 may determine that the first "Key_RogueDet" has expired. Accordingly, the UE 702 may mark internally the first "Key_RogueDet" as being old. Moreover, during a next cell camping the UE 702 may first use the second "Key_RogueDet." If an unauthentic cell is determined by the UE 702, the UE 702 may perform cell reselection to select a new cell.

In various embodiments, in a fourth communication 722 from the UE 702 to the RAN 704, if the UE 702 has determined a rogue cell during a previous cell selection procedure, the UE 702 may report the detected rogue information during camping on a new cell. This reporting may be done in an RRC Connection establishment procedure.

In certain embodiments, the UE 702 may not be aware of at time at which a key change occurs. As may be appreciated, at a time which the authenticity of a network unit 104 is being verified, the UE 702 may be using a key the UE 702 has stored. If the verification fails, the UE 702 may request a new key (e.g., by triggering tracking area update procedure). In embodiments in which the UE 702 is provided a new public key, the UE 702 may retry deciphering and/or validating signed system information. If the verification fails again, the UE 702 may assume that the network unit 104 is a rogue network unit. In some embodiments, the UE 702 may trigger cell reselection if the verification fails completely (e.g., after having retried with a newly provided key).

In various embodiments, there may be signed and/or encrypted information sent by the RAN 704 and the UE 702 may be configured with single key information for rogue cell detection. In some embodiments, the RAN 704 may broadcast encrypted and/or signed information during a transition period (e.g., 24 hours). In certain embodiments, the RAN 704 may indicate in broadcast information how long a transition period lasts. In various embodiments, the UE 702 is configured with single key information for rogue cell detection and it may be expected that, during a registration procedure, the UE network (e.g., the AMF 706) will update the UE 702 with the new key information for rogue cell detection which is broadcast by the network.

In certain embodiments, the UE 702 verifies first encrypted and/or signed information (e.g., SIB25) with a key available at the UE 702. If the verification works, then the network is fine (e.g., not rogue, not fake). If the verification does not work, the UE 702 verifies the second encrypted and/or signed information (e.g., SIB25*) with a key available at the UE 702. If this second verification works, then the network is fine. In some embodiments, the UE 702 may note that at a next registration management procedure, the UE 702 may indicate to the network that an update of the key information for rogue cell detection is needed (e.g., based on the fact that the second verification succeeded and the first verification did not). If the second verification does not work (depending on some detailed reasons), the UE 702 may determine the current cell as rogue and/or fake. Thus, the UE 702 may perform a cell reselection procedure.

Figure 8:
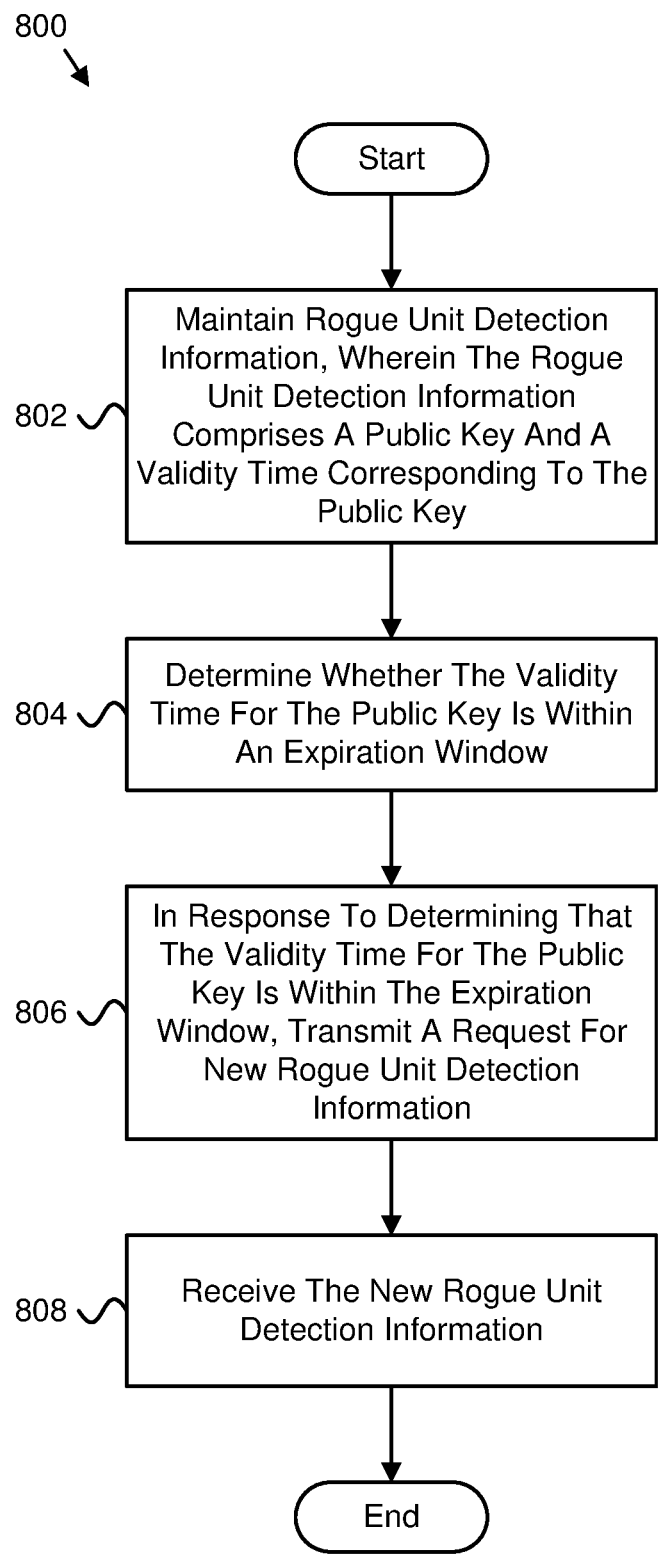
FIG. 8 is a schematic flow chart diagram illustrating one embodiment of a method for receiving rogue unit detection information.

FIG. 8 is a schematic flow chart diagram illustrating one embodiment of a method 800 for receiving rogue unit detection information. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include maintaining 802 rogue unit detection information. In such an embodiment, the rogue unit detection information includes a public key and a validity time corresponding to the public key. In certain embodiments, the method 800 includes determining 804 whether the validity time for the public key is within an expiration window. In various embodiments, the method 800 includes, in response to determining that the validity time for the public key is within the expiration window, transmitting 806 a request for new rogue unit detection information. In some embodiments, the method 800 includes receiving 808 the new rogue unit detection information.

In certain embodiments, the method 800 includes detecting a rogue unit using the new rogue unit detection information. In some embodiments, maintaining 802 the rogue unit detection information includes storing the rogue unit detection information and monitoring the validity time corresponding to the public key. In various embodiments, the rogue unit detection information includes a plurality of pubic keys and a plurality of validity times, and each public key of the plurality of public keys corresponds to a validity time of the plurality of validity times.

In one embodiment, determining 804 whether the validity time for the public key has expired includes comparing the validity time to a timer. In certain embodiments, determining 804 whether the validity time for the public key has expired includes comparing the validity time to a current time. In some embodiments, transmitting 806 the request for the new rogue unit detection information includes transmitting a request for a renewal of the public key.

In various embodiments, receiving 808 the new rogue unit detection information includes receiving the new rogue unit detection information as part of a signaling procedure. In one embodiment, the method 800 includes adding the new rogue unit detection information to the rogue unit detection information. In certain embodiments, the method 800 includes replacing the rogue unit detection information with the new rogue unit detection information. In some embodiments, the expiration window includes the validity time for the public key being expired or the validity time for the public key being within a predetermined time threshold.

Figure 9:
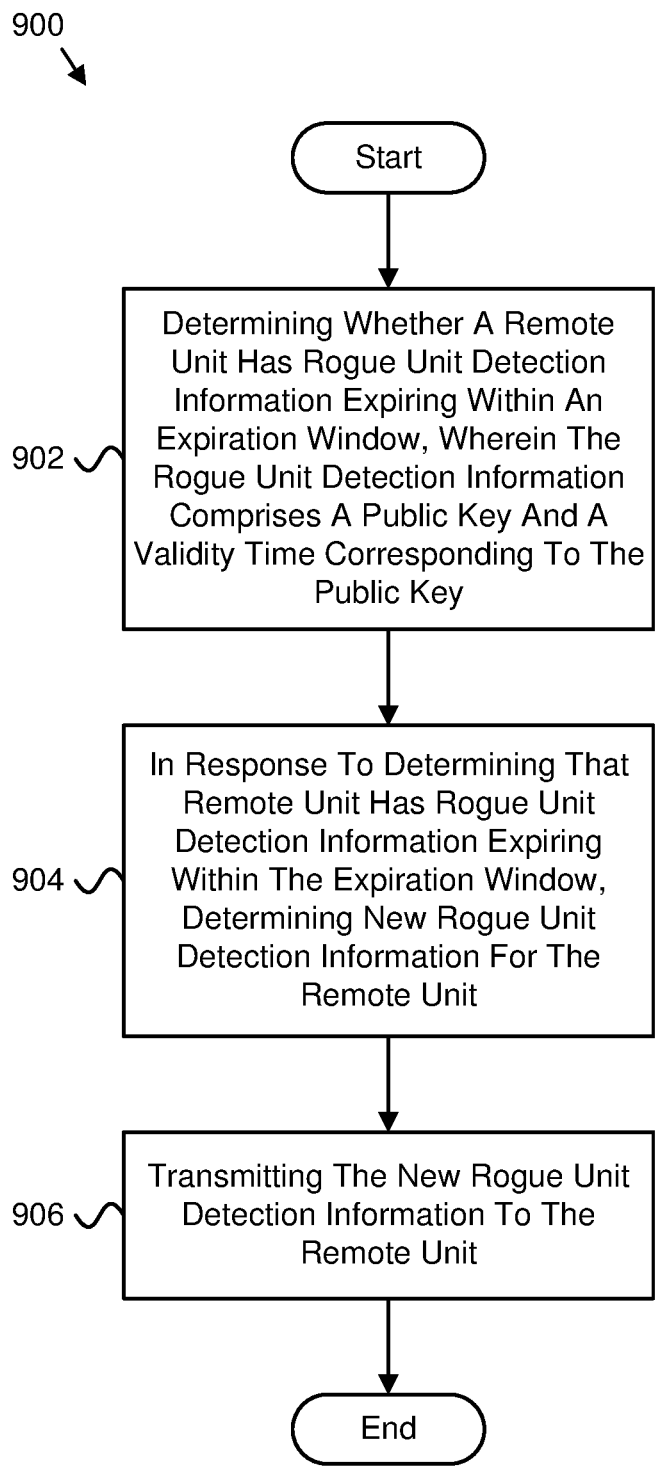
FIG. 9 is a schematic flow chart diagram illustrating one embodiment of a method for transmitting rogue unit detection information.

FIG. 9 is a schematic flow chart diagram illustrating one embodiment of a method 900 for transmitting rogue unit detection information. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include determining 902 whether a remote unit 102 has rogue unit detection information expiring within an expiration window. In such an embodiment, the rogue unit detection information includes a public key and a validity time corresponding to the public key. In certain embodiments, the method 900 includes, in response to determining that the remote unit 102 has rogue unit detection information expiring within the expiration window, determining 904 new rogue unit detection information for the remote unit 102. In various embodiments, the method 900 includes transmitting 906 the new rogue unit detection information to the remote unit 102.

In some embodiments, the rogue unit detection information includes a plurality of pubic keys and a plurality of validity times, and each public key of the plurality of public keys corresponds to a validity time of the plurality of validity times. In various embodiments, determining 902 whether the remote unit 102 has rogue unit detection information expiring within the expiration window includes determining that the validity time corresponding to the public key has expired or is to expire within a predetermined time. In certain embodiments, determining that the validity time corresponding to the public key has expired or is to expire within the predetermined time includes comparing the validity time to a timer.

In one embodiment, determining that the validity time corresponding to the public key has expired or is to expire within the predetermined time includes comparing the validity time to a current time. In some embodiments, determining 902 whether the remote unit 102 has rogue unit detection information expiring within the expiration window includes determining that the public key is to expire before a next remote unit interaction with a network unit 104. In various embodiments, determining 904 the new rogue unit detection information for the remote unit 102 includes calculating the new rogue unit detection information.

In certain embodiments, transmitting 906 the new rogue unit detection information to the remote unit 102 includes transmitting the new rogue unit detection information to the remote unit 102 as part of a signaling procedure. In one embodiment, the remote unit 102 adds the new rogue unit detection information to the rogue unit detection information. In some embodiments, the remote unit 102 replaces the rogue unit detection information with the new rogue unit detection information. In various embodiments, the expiration window includes the validity time for the public key being expired or the validity time for the public key being within a predetermined time threshold.

In one embodiment a method comprises: maintaining rogue unit detection information, wherein the rogue unit detection information comprises a public key and a validity time corresponding to the public key; determining whether the validity time for the public key is within an expiration window; in response to determining that the validity time for the public key is within the expiration window, transmitting a request for new rogue unit detection information; and receiving the new rogue unit detection information.

In certain embodiments, a method comprises detecting a rogue unit using the new rogue unit detection information.

In some embodiments, maintaining the rogue unit detection information comprises storing the rogue unit detection information and monitoring the validity time corresponding to the public key.

In various embodiments, the rogue unit detection information comprises a plurality of pubic keys and a plurality of validity times, and each public key of the plurality of public keys corresponds to a validity time of the plurality of validity times.

In one embodiment, determining whether the validity time for the public key has expired comprises comparing the validity time to a timer.

In certain embodiments, determining whether the validity time for the public key has expired comprises comparing the validity time to a current time.

In some embodiments, transmitting the request for the new rogue unit detection information comprises transmitting a request for a renewal of the public key.

In various embodiments, receiving the new rogue unit detection information comprises receiving the new rogue unit detection information as part of a signaling procedure.

In one embodiment, a method comprises adding the new rogue unit detection information to the rogue unit detection information.

In certain embodiments, a method comprises replacing the rogue unit detection information with the new rogue unit detection information.

In some embodiments, the expiration window comprises the validity time for the public key being expired or the validity time for the public key being within a predetermined time threshold.

In one embodiment an apparatus comprises: a processor that: maintains rogue unit detection information, wherein the rogue unit detection information comprises a public key and a validity time corresponding to the public key; and determines whether the validity time for the public key is within an expiration window; a transmitter that, in response to determining that the validity time for the public key is within the expiration window, transmits a request for new rogue unit detection information; and a receiver that receives the new rogue unit detection information.

In some embodiments, the processor detects a rogue unit using the new rogue unit detection information.

In various embodiments, the processor maintains the rogue unit detection information by storing the rogue unit detection information and monitoring the validity time corresponding to the public key.

In certain embodiments, the rogue unit detection information comprises a plurality of pubic keys and a plurality of validity times, and each public key of the plurality of public keys corresponds to a validity time of the plurality of validity times.

In one embodiment, the processor determines whether the validity time for the public key has expired by comparing the validity time to a timer.

In some embodiments, the processor determines whether the validity time for the public key has expired by comparing the validity time to a current time.

In various embodiments, the transmitter transmits the request for the new rogue unit detection information by transmitting a request for a renewal of the public key.

In certain embodiments, the receiver receives the new rogue unit detection information by receiving the new rogue unit detection information as part of a signaling procedure.

In one embodiment, the processor adds the new rogue unit detection information to the rogue unit detection information.

In some embodiments, the processor replaces the rogue unit detection information with the new rogue unit detection information.

In various embodiments, the expiration window comprises the validity time for the public key being expired or the validity time for the public key being within a predetermined time threshold.

In one embodiment a method comprises: determining whether a remote unit has rogue unit detection information expiring within an expiration window, wherein the rogue unit detection information comprises a public key and a validity time corresponding to the public key; in response to determining that the remote unit has rogue unit detection information expiring within the expiration window, determining new rogue unit detection information for the remote unit; and transmitting the new rogue unit detection information to the remote unit.

In some embodiments, the rogue unit detection information comprises a plurality of pubic keys and a plurality of validity times, and each public key of the plurality of public keys corresponds to a validity time of the plurality of validity times.

In various embodiments, determining whether the remote unit has rogue unit detection information expiring within the expiration window comprises determining that the validity time corresponding to the public key has expired or is to expire within a predetermined time.

In certain embodiments, determining that the validity time corresponding to the public key has expired or is to expire within the predetermined time comprises comparing the validity time to a timer.

In one embodiment, determining that the validity time corresponding to the public key has expired or is to expire within the predetermined time comprises comparing the validity time to a current time.

In some embodiments, determining whether the remote unit has rogue unit detection information expiring within the expiration window comprises determining that the public key is to expire before a next remote unit interaction with a network unit.

In various embodiments, determining the new rogue unit detection information for the remote unit comprises calculating the new rogue unit detection information.

In certain embodiments, transmitting the new rogue unit detection information to the remote unit comprises transmitting the new rogue unit detection information to the remote unit as part of a signaling procedure.

In one embodiment, the remote unit adds the new rogue unit detection information to the rogue unit detection information.

In some embodiments, the remote unit replaces the rogue unit detection information with the new rogue unit detection information.

In various embodiments, the expiration window comprises the validity time for the public key being expired or the validity time for the public key being within a predetermined time threshold.

In one embodiment an apparatus comprises: a processor that: determines whether a remote unit has rogue unit detection information expiring within an expiration window, wherein the rogue unit detection information comprises a public key and a validity time corresponding to the public key; and in response to determining that the remote unit has rogue unit detection information expiring within the expiration window, determines new rogue unit detection information for the remote unit; and a transmitter that transmits the new rogue unit detection information to the remote unit.

In some embodiments, the rogue unit detection information comprises a plurality of pubic keys and a plurality of validity times, and each public key of the plurality of public keys corresponds to a validity time of the plurality of validity times.

In various embodiments, the processor determines whether the remote unit has rogue unit detection information expiring within the expiration window by determining that the validity time corresponding to the public key has expired or is to expire within a predetermined time.

In certain embodiments, the processor determines that the validity time corresponding to the public key has expired or is to expire within the predetermined time by comparing the validity time to a timer.

In one embodiment, the processor determines that the validity time corresponding to the public key has expired or is to expire within the predetermined time by comparing the validity time to a current time.

In some embodiments, the processor determines whether the remote unit has rogue unit detection information expiring within the expiration window by determining that the public key is to expire before a next remote unit interaction with a network unit.

In various embodiments, the processor determines the new rogue unit detection information for the remote unit by calculating the new rogue unit detection information.

In certain embodiments, the transmitter transmits the new rogue unit detection information to the remote unit by transmitting the new rogue unit detection information to the remote unit as part of a signaling procedure.

In one embodiment, the remote unit adds the new rogue unit detection information to the rogue unit detection information.

In some embodiments, the remote unit replaces the rogue unit detection information with the new rogue unit detection information.

In various embodiments, the expiration window comprises the validity time for the public key being expired or the validity time for the public key being within a predetermined time threshold.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   maintaining rogue unit detection information at a user equipment, wherein the rogue unit detection information comprises information for detecting a rogue unit, the rogue unit comprises a false base station, the rogue unit detection information comprises a public key and a validity time corresponding to the public key, the public key is received in broadcast signaling for a plurality of user equipments, and the validity time is received within system information for the user equipment;
   determining, at the user equipment, whether the validity time for the public key is within an expiration window;
   in response to determining that the validity time for the public key is within the expiration window, transmitting, from the user equipment to a network unit, a request for new rogue unit detection information comprising a new public key and a new validity time corresponding to the new public key; and
   receiving, at the user equipment, the new rogue unit detection information.

2. The method of claim 1, wherein the rogue unit detection information comprises a plurality of pubic keys and a plurality of validity times, and each public key of the plurality of public keys corresponds to a validity time of the plurality of validity times.

3. The method of claim 1, wherein the expiration window comprises the validity time for the public key being expired or the validity time for the public key being within a predetermined time threshold.

4. An apparatus comprising a user equipment, the apparatus comprising:
   a processor that:
      maintains rogue unit detection information, wherein the rogue unit detection information comprises information for detecting a rogue unit, the rogue unit comprises a false base station, the rogue unit detection information comprises a public key and a validity time corresponding to the public key, the public key is received in broadcast signaling for a plurality of user equipments, and the validity time is received within system information for the user equipment; and
      determines whether the validity time for the public key is within an expiration window;
   a transmitter that, in response to determining that the validity time for the public key is within the expiration window, transmits a request for new rogue unit detection information comprising a new public key and a new validity time corresponding to the new public key to a network unit; and
   a receiver that receives the new rogue unit detection information.

5. The apparatus of claim 4, wherein the processor detects a rogue unit using the new rogue unit detection information.

6. The apparatus of claim 4, wherein the processor maintains the rogue unit detection information by storing the rogue unit detection information and monitoring the validity time corresponding to the public key.

7. The apparatus of claim 4, wherein the processor determines whether the validity time for the public key has expired by comparing the validity time to a timer.

8. The apparatus of claim 4, wherein the processor determines whether the validity time for the public key has expired by comparing the validity time to a current time.

9. The apparatus of claim 4, wherein the transmitter transmits the request for the new rogue unit detection information by transmitting a request for a renewal of the public key.

10. The apparatus of claim 4, wherein the receiver receives the new rogue unit detection information by receiving the new rogue unit detection information as part of a signaling procedure.

11. The apparatus of claim 4, wherein the processor adds the new rogue unit detection information to the rogue unit detection information.

12. The apparatus of claim 4, wherein the processor replaces the rogue unit detection information with the new rogue unit detection information.

13. A method comprising:
   determining at a network unit, whether a user equipment has rogue unit detection information expiring within an expiration window, wherein the rogue unit detection information comprises information for detecting a rogue unit, the rogue unit comprises a false base station, the rogue unit detection information comprises a public key and a validity time corresponding to the public key, the public key is received in broadcast signaling for a plurality of user equipments, and the validity time is received within system information for the user equipment;
   in response to determining that the user equipment has rogue unit detection information expiring within the expiration window, determining, at the network unit, new rogue unit detection information comprising a new public key and a new validity time corresponding to the new public key for the user equipment; and
   transmitting, from the network unit, the new rogue unit detection information to the user equipment.

14. The method of claim 13, wherein determining whether the user equipment has rogue unit detection information expiring within the expiration window comprises determining that the validity time corresponding to the public key has expired or is to expire within a predetermined time.

15. The method of claim 13, wherein determining whether the user equipment has rogue unit detection information expiring within the expiration window comprises determining that the public key is to expire before a next user equipment interaction with the network unit.

16. The method of claim 13, wherein determining the new rogue unit detection information for the user equipment comprises calculating the new rogue unit detection information.

17. An apparatus comprising a network unit, the apparatus comprising:
   a processor that:
      determines whether a user equipment has rogue unit detection information expiring within an expiration window, wherein the rogue unit detection information comprises information for detecting a rogue unit, the rogue unit comprises a false base station, the rogue unit detection information comprises a public key and a validity time corresponding to the public key, the public key is received in broadcast signaling for a plurality of user equipments, and the validity time is received within system information for the user equipment; and
      in response to determining that the user equipment has rogue unit detection information expiring within the expiration window, determines new rogue unit detection information comprising a new public key and a new validity time corresponding to the new public key for the user equipment; and
   a transmitter that transmits the new rogue unit detection information to the user equipment.

18. The apparatus of claim 17, wherein the processor determines whether the user equipment has rogue unit detection information expiring within the expiration window by determining that the validity time corresponding to the public key has expired or is to expire within a predetermined time.

19. The apparatus of claim 17, wherein the processor determines whether the user equipment has rogue unit detection information expiring within the expiration window by determining that the public key is to expire before a next user equipment interaction with the network unit.

20. The apparatus of claim 17, wherein the processor determines the new rogue unit detection information for the user equipment by calculating the new rogue unit detection information.

* * * * *